United States Patent
Hull et al.

(10) Patent No.: US 9,880,544 B2
(45) Date of Patent: Jan. 30, 2018

(54) LOCATING A WORKPIECE USING A MEASUREMENT OF A WORKPIECE FEATURE

(71) Applicant: The Boeing Company, Chicago, IL (US)

(72) Inventors: Jerald A. Hull, Charleston, SC (US); Philip L. Freeman, Ladson, SC (US)

(73) Assignee: THE BOEING COMPANY, Chicago, IL (US)

( * ) Notice: Subject to any disclaimer, the term of this patent is extended or adjusted under 35 U.S.C. 154(b) by 327 days.

(21) Appl. No.: 14/701,937

(22) Filed: May 1, 2015

(65) Prior Publication Data

US 2016/0318144 A1 Nov. 3, 2016

(51) Int. Cl.
*G05B 19/18* (2006.01)
*G05B 19/402* (2006.01)
*G05B 19/401* (2006.01)

(52) U.S. Cl.
CPC ......... *G05B 19/402* (2013.01); *G05B 19/401* (2013.01); *G05B 2219/37207* (2013.01)

(58) Field of Classification Search
CPC .............................. G05B 19/00; G05B 19/402
See application file for complete search history.

(56) References Cited

U.S. PATENT DOCUMENTS

| | | | |
|---|---|---|---|
| 7,774,083 B2 | 8/2010 | Freeman et al. | |
| 8,200,354 B2 | 1/2012 | Freeman et al. | |
| 8,630,729 B2 | 1/2014 | Freeman et al. | |
| 2005/0201613 A1* | 9/2005 | Mostafavi | A61B 6/463 382/154 |
| 2007/0276539 A1* | 11/2007 | Habibi | B25J 9/1612 700/245 |
| 2008/0188986 A1* | 8/2008 | Hoppe | B25J 9/1692 700/263 |
| 2008/0285710 A1* | 11/2008 | Schroeder | A61B 6/032 378/20 |
| 2011/0246130 A1* | 10/2011 | Taguchi | B25J 9/1694 702/150 |
| 2011/0268322 A1* | 11/2011 | Clausen | G01B 11/25 382/106 |
| 2011/0295408 A1* | 12/2011 | Burgel | G05B 19/401 700/114 |
| 2014/0121821 A1* | 5/2014 | Gu | B23Q 17/225 700/186 |

(Continued)

*Primary Examiner* — Vincent Tran
(74) *Attorney, Agent, or Firm* — Womble Bond Dickinson (US) LLP

(57) ABSTRACT

A method of determining a pose of a workpiece includes receiving known positions of a plurality of reference features of a workpiece in a first pose in a first coordinate space, determining from the known positions an estimate of the first pose of the workpiece in a second coordinate space in which any pose of the workpiece is defined by six distinct components, and at least one of the six components are known. The method includes receiving a position of a second feature of the workpiece in the second coordinate space when the workpiece is disposed in a distinct, second pose in which the at least one known components remain constant between the first and second pose. The method includes determining the second pose of the workpiece from the first pose estimate and the position of the second feature of the workpiece in the second pose.

18 Claims, 10 Drawing Sheets

(56) References Cited

U.S. PATENT DOCUMENTS

2015/0216621 A1* 8/2015 Fichtinger .............. A61B 6/504
600/407
2015/0332464 A1* 11/2015 O'Keefe ............ G06K 9/00201
348/47

* cited by examiner

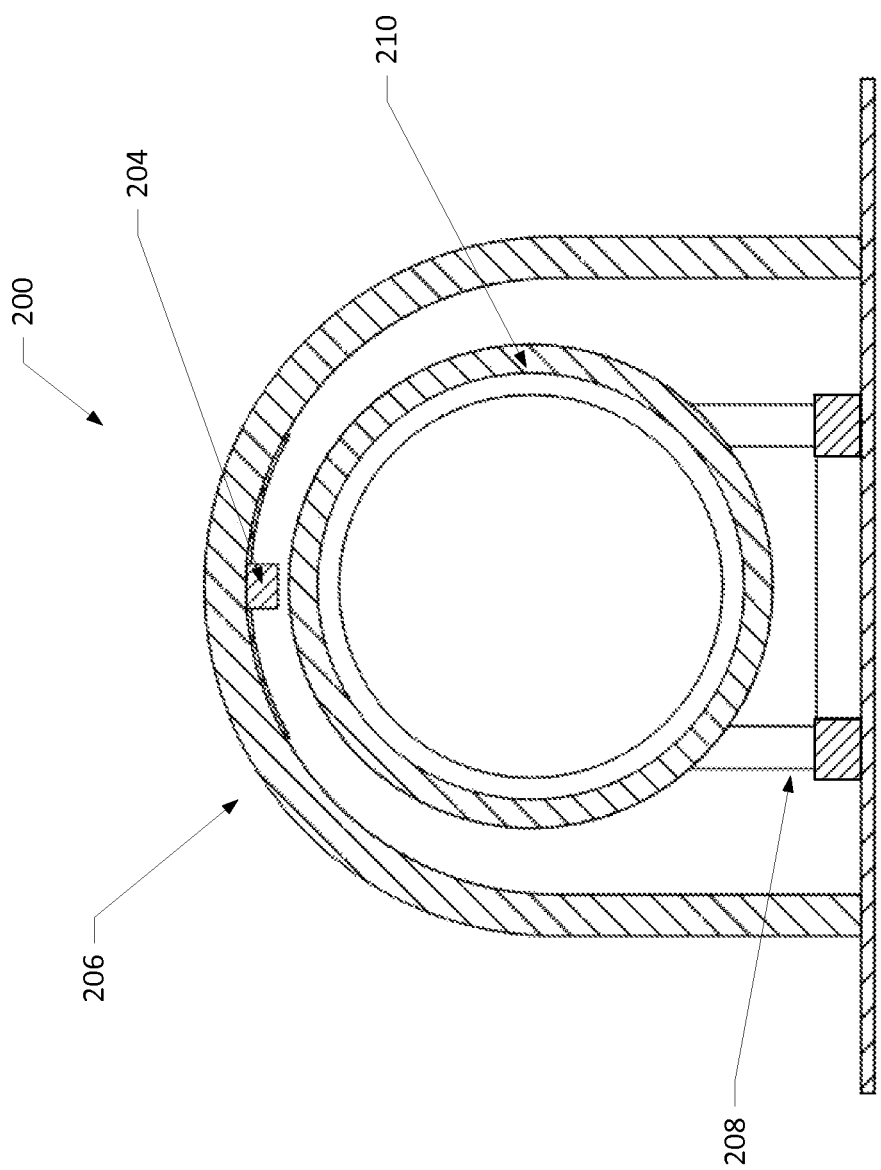

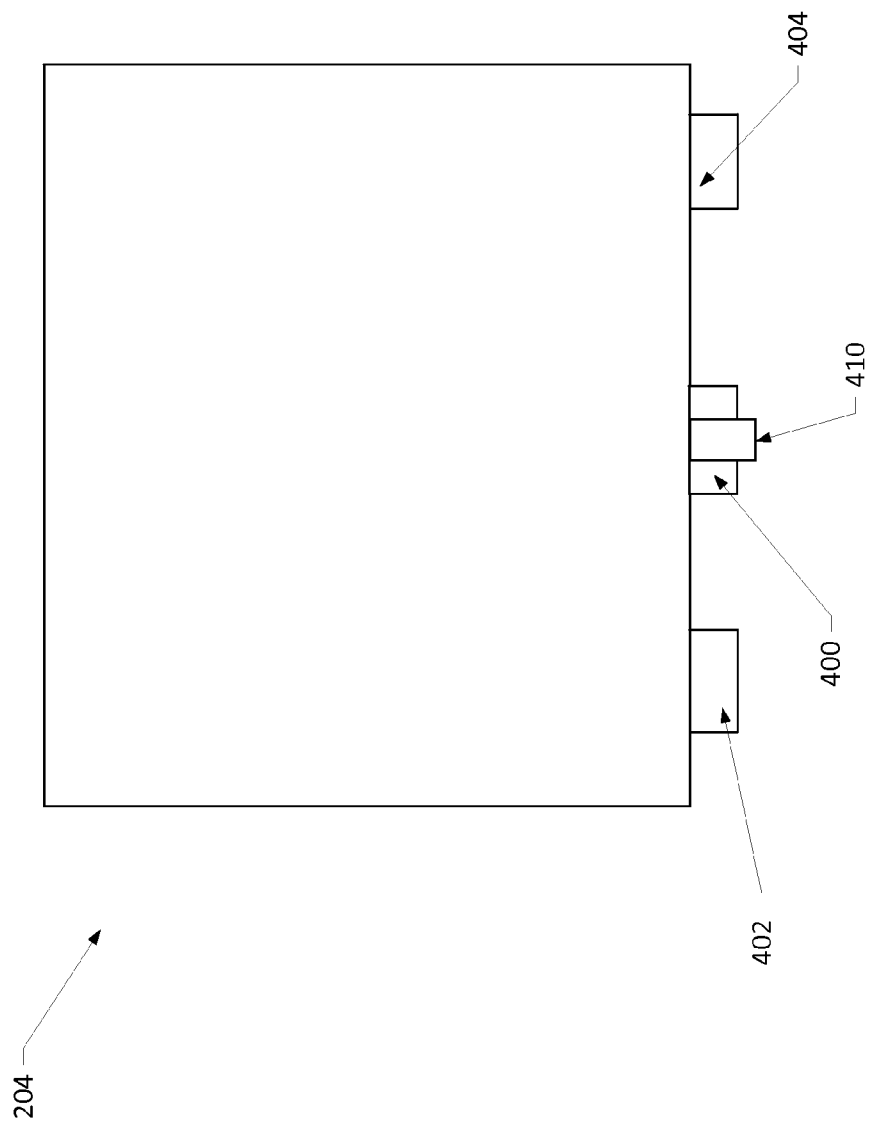

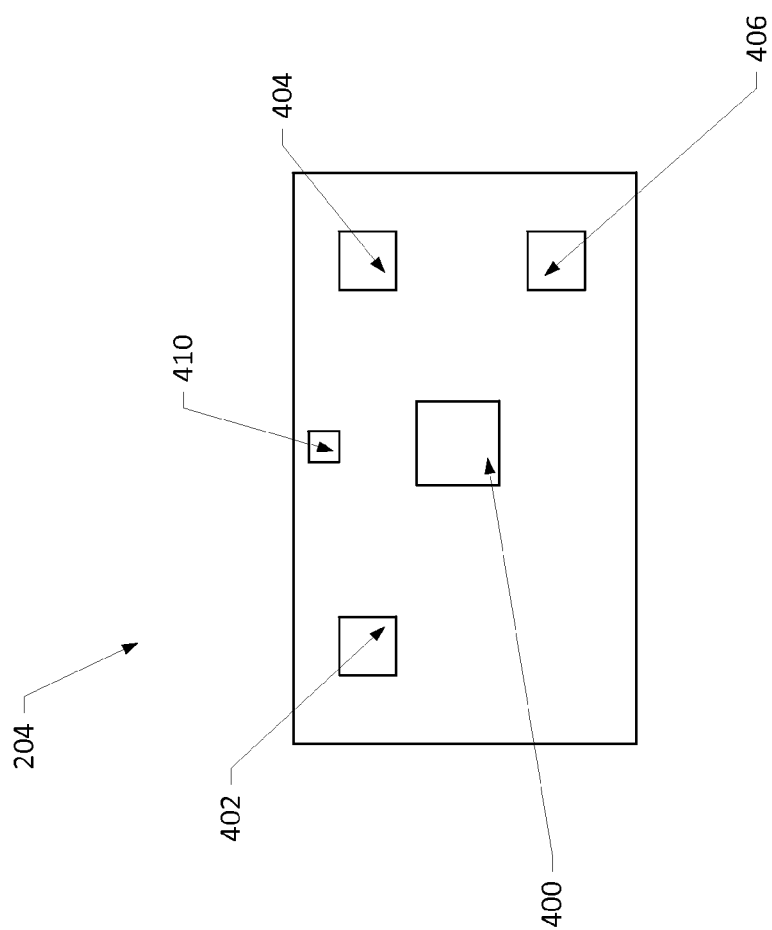

LOCATING A WORKPIECE USING A MEASUREMENT OF A WORKPIECE FEATURE

TECHNOLOGICAL FIELD

The present disclosure relates generally to locating or tracking an object such as a workpiece or a tool during a machining or manufacturing process and, in particular, to determining a pose of a first object such as a workpiece with respect to a second object such as an automated numerical control machine during a machining or manufacturing process.

BACKGROUND

During a machining or manufacturing process, it may be desirable to adjust the pose of a workpiece and, in order to ensure the accuracy of the process, actively monitor and/or determine the pose of the workpiece as a machine tool of an automated machine performs manufacturing operations on the workpiece. For example, a workpiece such as an aircraft fuselage section may be worked upon in relatively expansive manufacturing facilities by automated machines. Further, aircraft fuselage sections may be required to change poses so that an automated machine within those facilities is able to perform manufacturing operations on the aircraft fuselage sections.

To ensure the machine performing the machining or manufacturing process engages the workpiece in an accurate and precise manner, the pose of the workpiece may be monitored, analyzed, and/or updated throughout the process. Some machines may be configured to only operate within a limited operational envelope. Particularly, the machine may be configured to only engage a first portion and/or zone of a workpiece when the workpiece is disposed in a first pose, as the first portion is the only portion accessible by the machine when the workpiece is positioned in the first pose (i.e., the first portion is the only portion within the operational envelope of the machine when the workpiece is positioned in the first pose). In order for the machine to operate on another portion of the workpiece (e.g., a second portion of the workpiece) differing from the first portion during the machining process, the workpiece must be repositioned with respect to the machine from the first pose to a second pose such that the second portion is accessible by and is disposed within the operational envelope of the machine. Additionally, to ensure the machine accurately and precisely engages a second portion of the workpiece when the workpiece is disposed in the second pose, the second pose must be accurately determined after the workpiece has been moved from the first pose to the second pose. More specifically, the machine must determine the second pose of the workpiece after the machine has repositioned the workpiece from the first pose to the second pose before the machine can accurately engage the second portion of the workpiece.

BRIEF SUMMARY

Example implementations of the present disclosure are directed to an improved system, method and computer-readable storage medium for locating a workpiece, machine part and/or the like. Example implementations provide a simplified and efficient approach to locating the pose of a workpiece during a machining or manufacturing process.

Example implementations provide a method of determining a pose of a workpiece during a machining or manufacturing process. The method includes receiving known positions of a plurality of reference features of a workpiece in a first pose in a first coordinate space. The method can further include determining from the known positions an estimate of the first pose of the workpiece in a second coordinate space in which any pose of the workpiece including the first pose is definable by six distinct components, at least one of the six components of the first pose being known. The method includes receiving a position of a second feature of the workpiece in the second coordinate space, the workpiece being disposed in a distinct, second pose in which the at least one of the six known components of the first pose are common to the second pose. The method includes determining the second pose of the workpiece from the estimate of the first pose of the workpiece and the position of the second feature of the workpiece in the second pose.

In some example implementations of the method of the preceding or subsequent example implementations, or any combination thereof, the method further includes transmitting the second pose of the workpiece to a machine tool configured to perform a machining or manufacturing operation on the workpiece based thereon.

In some example implementations of the method of the preceding or subsequent example implementations, or any combination thereof, receiving the known positions of the plurality of reference features of the workpiece includes receiving the positions of three discrete reference features of the workpiece.

In some example implementations of the method of the preceding or subsequent example implementations, or any combination thereof, the six distinct components in which any pose of the workpiece is definable include three components of translation and three components of rotation, the three components of rotation including pitch, yaw and roll, and the known at least one of the six components being common to the first pose and the second pose. In some example implementations, two of the six components, which are known and common to both the first and second pose, are the pitch and yaw of the workpiece.

In some example implementations of the method of the preceding or subsequent example implementations, or any combination thereof, receiving the position of the second feature of the workpiece in the second coordinate space includes receiving a position of the second feature of the workpiece in a third coordinate space and translating the position of the second feature from the third coordinate space to the second coordinate space.

In some example implementations of the method of the preceding or subsequent example implementations, or any combination thereof, any of the coordinate spaces correspond to at least one of the workpiece, a machine, a machine tool, a workpiece carrier, a change in a pose of the workpiece, and/or a distinct, second pose of the workpiece.

In some example implementations of the method of the preceding or subsequent example implementations, or any combination thereof, receiving the position of the second feature includes receiving a measured position of the workpiece. Additionally or alternatively, the method includes receiving a measured position of the second feature of the workpiece. In some example implementations of the method of the preceding or subsequent example implementations, or any combination thereof, determining the second pose of the workpiece includes determining a solution to a system of equations corresponding to a known position of the second feature of the workpiece in the second pose, the measured position of the second feature of the workpiece in the second pose, and a rotation of the workpiece about a longitudinal axis of the workpiece. In some example implementations of the method of the preceding or subsequent example implementations, or any combination thereof, determining the second pose of the workpiece includes determining a solution to a system of equations corresponding to the unknown components defining the second pose of the workpiece with information provided from a measurement that corresponds with the second feature of the workpiece.

Example implementations of the present disclosure may provide for an apparatus comprising at least a processor and a memory storing executable instructions that in response to execution by the processor cause the apparatus to at least receive known positions of a plurality of reference features of a workpiece in a first pose in a first coordinate space. The apparatus may be further caused to determine from the known positions an estimate of the first pose of the workpiece in a second coordinate space in which any pose of the workpiece including the first pose is definable by six distinct components, at least one of the six components of the first pose being known. In some example implementation of the present disclosure, the apparatus may be caused to receive a position of a second feature of the workpiece in the second coordinate space, the workpiece being disposed in a distinct, second pose in which the at least one of the six known components of the first pose are common to the second pose. The apparatus may be further caused to determine the second pose of the workpiece from the estimate of the first pose of the workpiece and the position of the second feature of the workpiece in the second pose.

In some example implementations of the apparatus of the preceding or subsequent example implementations, or any combination thereof, the memory stores further executable instructions that in response to execution by the processor cause the apparatus to transmit the second pose of the workpiece to a machine tool configured to perform a machining or manufacturing operation on the workpiece based thereon.

In some example implementations of the apparatus of the preceding or subsequent example implementations, or any combination thereof, the apparatus being caused to receive positions of the plurality of reference features of the workpiece includes the apparatus being caused to receive the positions of three discrete reference features of the workpiece.

In some example implementations of the apparatus of the preceding or subsequent example implementations, or any combination thereof, the six distinct components in which any pose of the workpiece is definable include three components of translation and three components of rotation, the three components of rotation including pitch, yaw and roll, and the known at least one of the six components being common to the first pose and the second pose. In some example implementations, two of the six components, which are known and common to both the first and second pose, are the pitch and yaw of the workpiece.

In some example implementations of the apparatus of the preceding or subsequent example implementations, or any combination thereof, the apparatus being caused to receive the position of the second feature of the workpiece in the second coordinate space includes the apparatus being caused to receive a position of the second feature of the workpiece in a third coordinate space, and translate the position of the second feature of the workpiece from the third coordinate space to the second coordinate space.

In some example implementations of the apparatus of the preceding or subsequent example implementations, or any combination thereof, any of the coordinate spaces correspond to at least one of the workpiece, a machine, a machine tool, a workpiece carrier, a change in a pose of the workpiece, and/or a distinct, second pose of the workpiece.

In some example implementations of the apparatus of the preceding or subsequent example implementations, or any combination thereof, the apparatus being configured to receive the position of the second feature of the workpiece includes the apparatus being caused to receive a measured position of the workpiece, and the apparatus being caused to determine the second pose of the workpiece includes the apparatus being caused to determine a solution to a system of equations corresponding to a known position of the second feature of the workpiece in the second pose, the measured position of the second feature of the workpiece in the second pose, and a rotation of the workpiece about a longitudinal axis of the workpiece. In some example implementations of the apparatus of the preceding or subsequent example implementations, or any combination thereof, and the apparatus being caused to determine the second pose of the workpiece includes the apparatus being caused to determine a solution to a system of equations corresponding to the unknown components defining the second pose of the workpiece with information provided from a measurement that corresponds with the second feature of the workpiece.

A computer-readable storage medium that is non-transitory and has computer-readable program code portions stored therein that, in response to execution by a processor, cause an apparatus to at least perform the method of any preceding example implementation, or any combination thereof.

The features, functions and advantages discussed herein may be achieved independently in various example implementations or may be combined in yet other example implementations further details of which may be seen with reference to the following description and drawings.

BRIEF DESCRIPTION OF THE DRAWING(S)

Having thus described example implementations of the disclosure in general terms, reference will now be made to the accompanying drawings, which are not necessarily drawn to scale, and wherein:

FIGS. 2B and 2C illustrate cross-sectional views of the machine system of FIG. 2A taken along lines 2B-2B and 2C-2C respectively according to example implementations;

FIGS. 4A and 4B illustrate respectively a front and bottom views of an end effector unit according to example implementations;

DETAILED DESCRIPTION

Figure 1:
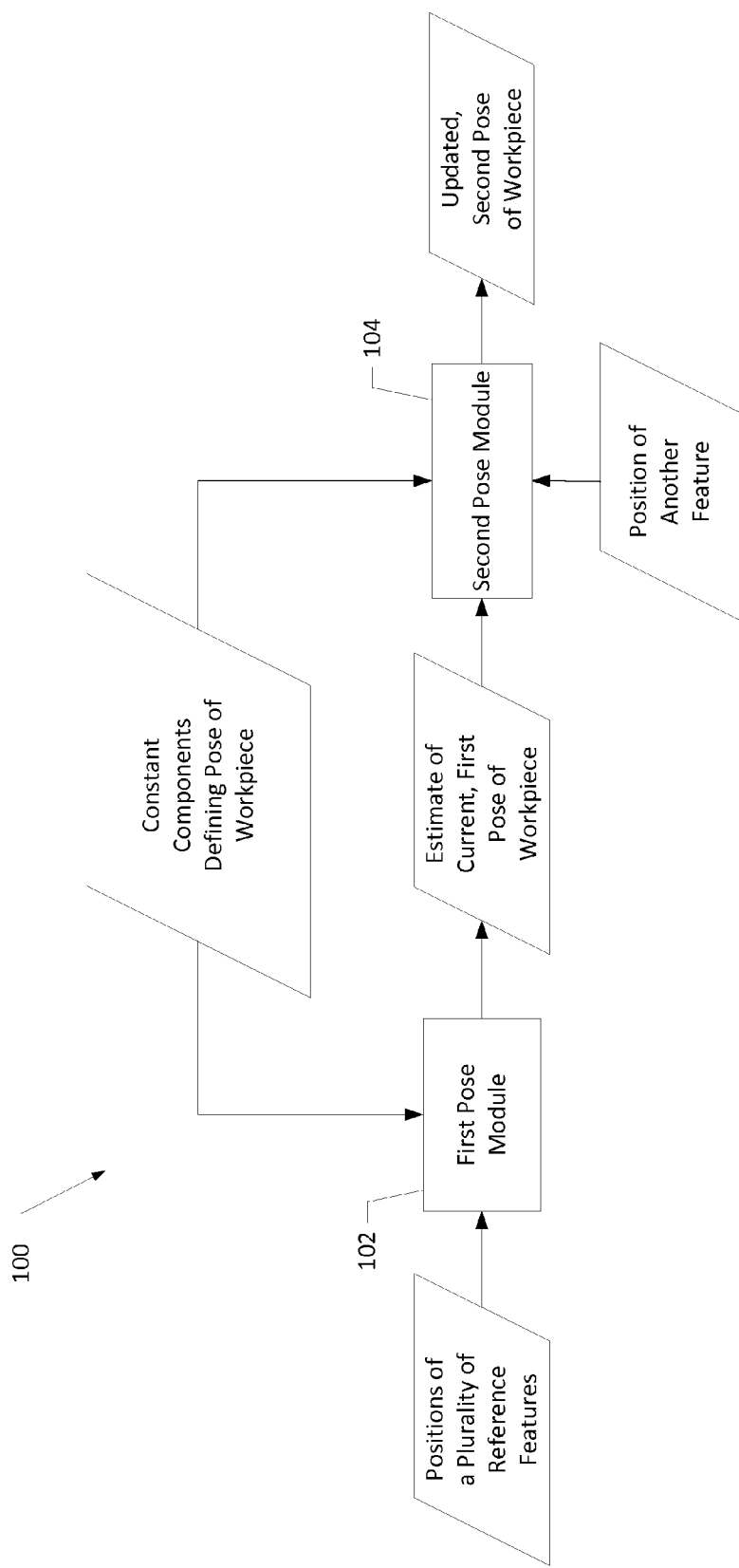
FIG. 1 illustrates a system for determining a pose of a workpiece according to example implementations of the present disclosure.

Some implementations of the present disclosure will now be described more fully hereinafter with reference to the accompanying drawings, in which some, but not all implementations of the disclosure are shown. Indeed, various implementations of the disclosure may be expressed in many different forms and should not be construed as limited to the implementations set forth herein; rather, these exemplary implementations are provided so that this disclosure will be thorough and complete, and will fully convey the scope of the disclosure to those skilled in the art. For example, unless otherwise indicated, something being described as being a first, second or the like should not be construed to imply a particular order. Also, something may be described as being above something else (unless otherwise indicated) may instead be below, and vice versa; and similarly, something described as being to the left of something else may instead be to the right, and vice versa. As used in the specification, and in the appended claims, the singular forms "a", "an", "the", include plural referents unless the context clearly dictates otherwise. Like reference numerals refer to like elements throughout.

Implementations of the present disclosure provide for a method for determining a pose of a workpiece during a machining or manufacturing process. In particular, the method can include transporting a workpiece, such as an aircraft fuselage section, to an automated numerical control machine configured to operably engage the workpiece in a machining or manufacturing process. For example, a workpiece carrier of a machine system is configured to transport the workpiece proximate to a machine tool of the machine system and dispose the workpiece in a first pose.

Figure 2A:
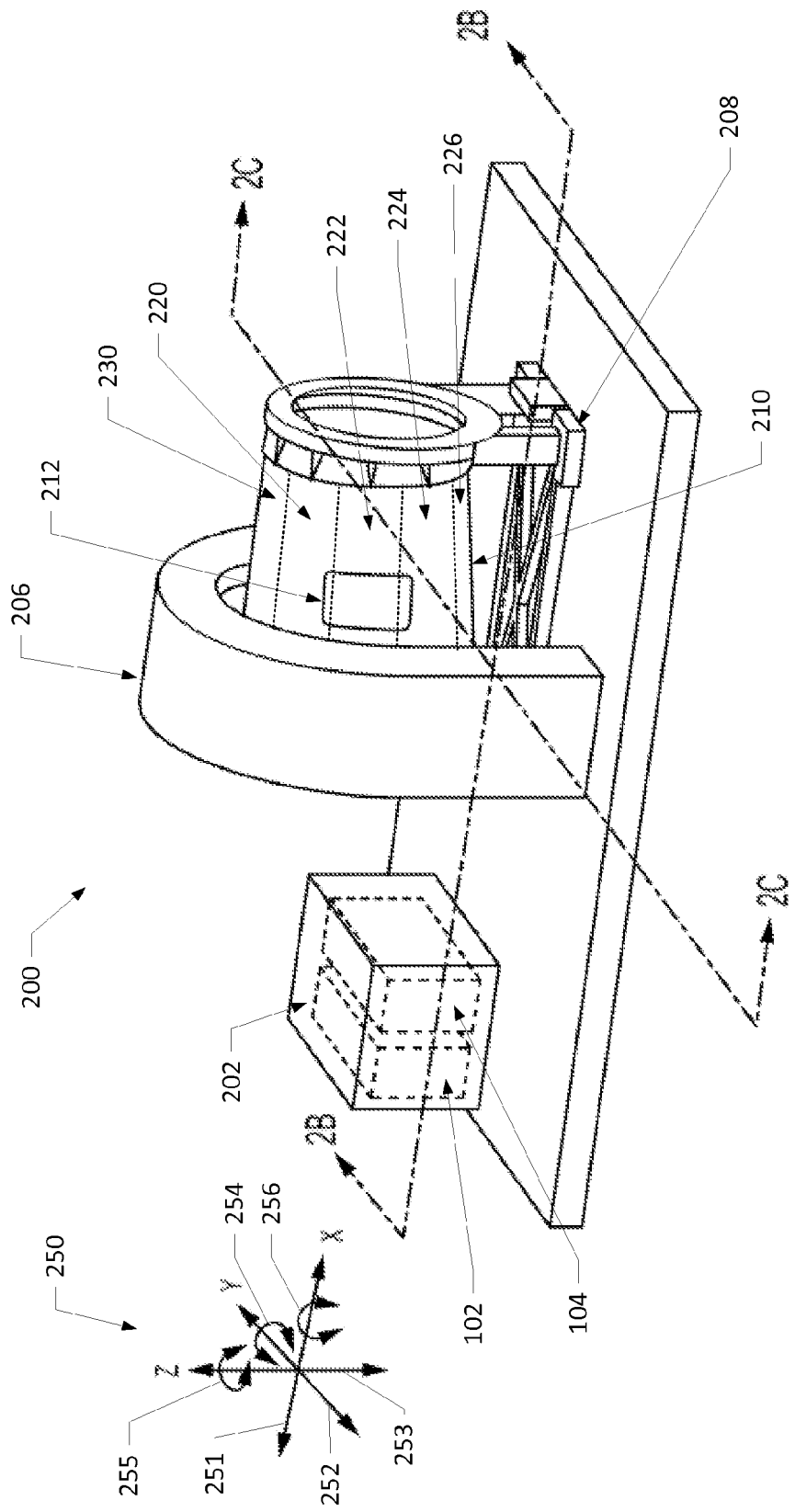
FIG. 2A illustrates a perspective view of a three-dimensional coordinate system and a machine system configured to determine a pose of a workpiece during a machining process, wherein the workpiece is disposed in a first pose, according to example implementations.
Figure 2B:
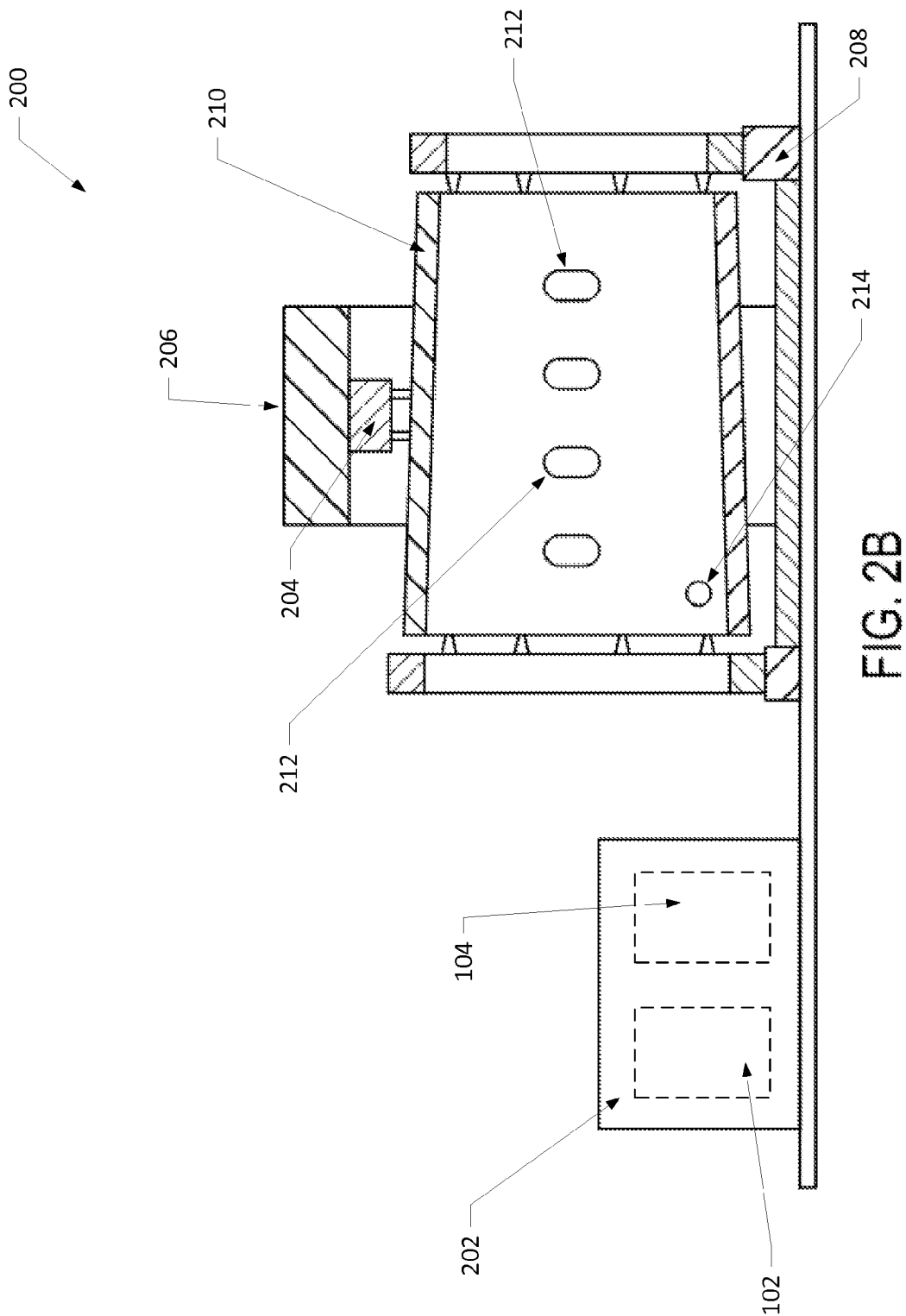
Figure 2D:
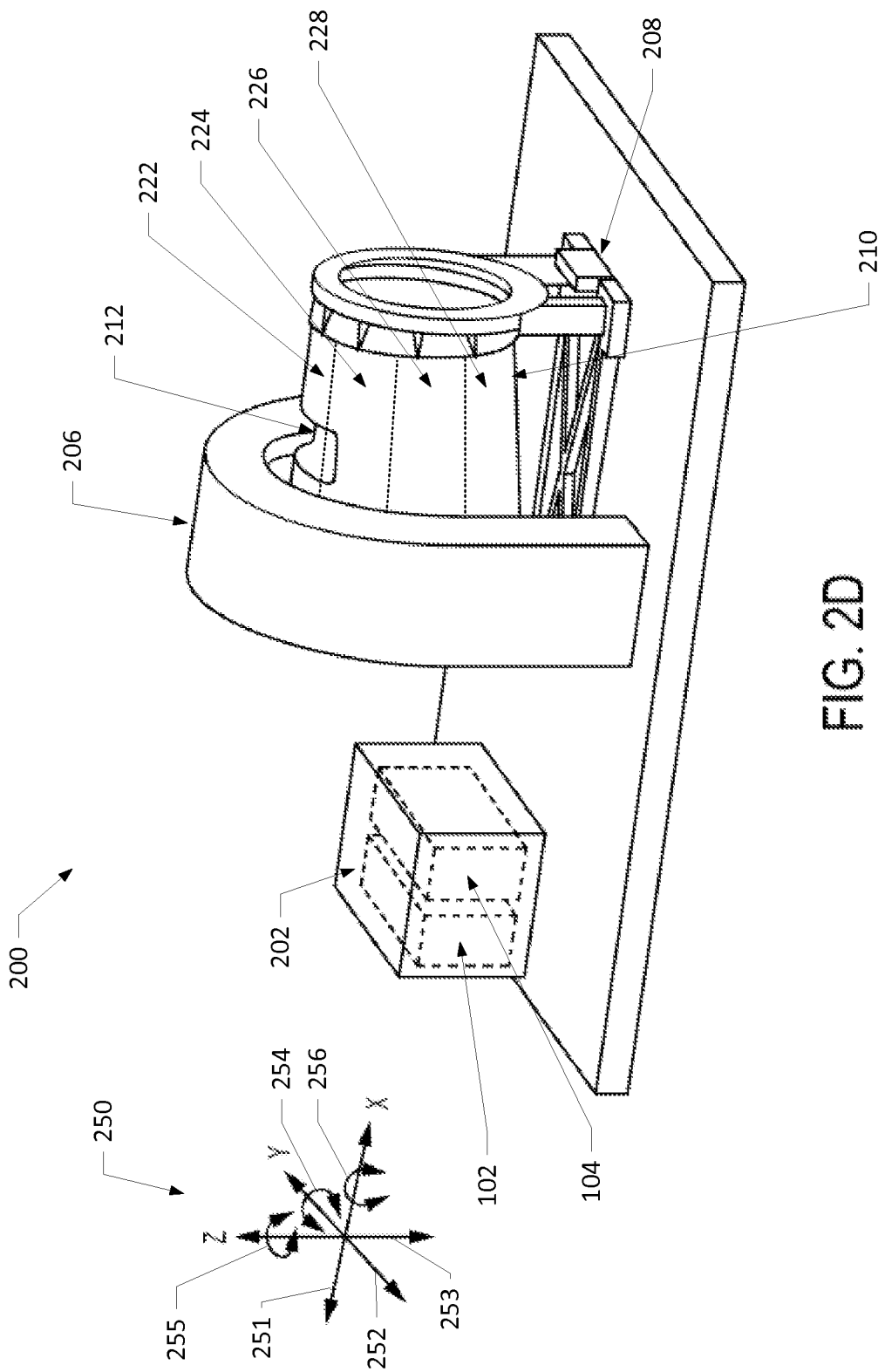
FIG. 2D illustrates a perspective view of the three-dimensional coordinate system and the machine system of FIG. 2A with the workpiece disposed in a distinct, second pose, according to example implementations.

As described herein, the pose of the workpiece refers to the combination of its linear position and its angular position (i.e., orientation) in a three-dimensional coordinate system. Specifically, the pose of the workpiece is defined by six distinct components, wherein the linear position includes three components of translation and the angular position includes three components of rotation. As shown in FIGS. 2A and 2D, the three components of translation in a three-dimensional coordinate system 250 includes (1) forwards/backwards 251, (2) left/right 252, and (3) up/down 253, and the three components of rotation includes (4) pitch 254, (5) yaw 255, and (6) roll 256.

Additionally, the method can include obtaining measurements of the positions of a plurality of reference features of the workpiece disposed in a first pose in the first coordinate space. The machine system can include a positioning sensor configured to obtain measurements of features (reference features or otherwise) of the workpiece and transmit the measurements to a control unit of the machine system. The method can also include the control unit receiving the known positions from the positioning sensor via a communications interface. Additionally, the method includes the control unit determining an estimate of the first pose of the workpiece in a second coordinate space where at least one of the six components defining the first pose is known. More specifically, various implementations described herein provide a method that includes holding n degree(s) of freedom (i.e., n of the 6 components defining the pose of the workpiece) constant from the first pose to the second pose and then solving for the remaining 6–n components, where n can range from 1 to 5. While various exemplary implementations described herein discuss holding two components constant (e.g., pitch and yaw) between the first and second poses, one of ordinary skill in the art will appreciate that the method can be implemented by maintaining one or more component(s) constant between the first and second poses.

The method can further include the workpiece carrier rotating the workpiece along the longitudinal axis of the workpiece, thereby moving the workpiece from the first pose to a second pose. In one implementation, the known component(s) defining the pose of the workpiece may be constant values that are common to both the first and second pose. For example, the pitch and yaw components defining the pose of the workpiece may be known and may be constant values common to both the first and second pose. Additionally, the pitch and yaw components defining the first and second pose of the workpiece may have zero values (i.e., the workpiece has zero pitch and yaw).

According to some implementations, the method also includes the positioning sensor obtaining measurement(s) of a position of a second and/or additional feature(s) of the workpiece in the second pose in a second coordinate space and transmitting the measurement(s) to the control unit. In another implementation, the method can include the control unit receiving the position of the second feature of the workpiece from the positioning sensor via the communications interface. As described herein, the second feature and/or additional feature(s) can be defined by any discrete feature of the workpiece whose position is obtained and/or measured so as to determine the second pose or any subsequent pose of the workpiece. Any feature of the workpiece, including a reference feature, may be embodied as the second feature and/or additional feature(s) so long as the second feature and/or additional feature(s) are obtained and/or measured for determining the second pose of the workpiece. In some implementations, measurement(s) of a single, second feature may provide the necessary information required to determine the second pose of the workpiece. In another implementation, measurement(s) of a second and an additional third feature may provide the necessary information required to determine the second pose of the workpiece. While various exemplary implementations described herein discuss obtaining a measurement(s) corresponding to the position of a single, second feature, one of ordinary skill in the art will appreciate that the method can be implemented by obtaining measurement(s) of one or more features so as to determine the second pose of the workpiece.

Additionally, the method can include the control unit determining the second pose of the workpiece from the estimate of the first pose of the workpiece and the position of the second feature of the workpiece. In particular, the method includes the control unit determining the second pose of the workpiece by determining a solution to a system of equations corresponding to a change in the linear position and a change in the roll component by moving the workpiece from the first pose to the second pose. Further, the method includes the control unit determining the second pose from the constant values of the pitch and yaw components that are common to both the first and second pose.

As such, implementations of the present disclosure provide increased accuracy and efficiency during a manufacturing or machining process of a workpiece such as an aircraft component, aircraft fuselage section, and/or the like. In particular, implementations of the present disclosure provide increased accuracy and efficiency in determining the pose of a workpiece during the machining process. Determining the pose of the workpiece relative to an automated machine accurately and precisely in a repeatable manner is desirable to ensure a suitable, reliable and consistent product is produced. Additionally or alternatively, implementations of the present disclosure provide increased efficiency in the machining process of the workpiece by reducing the amount of time utilized for determining the pose of the workpiece. Some implementations provide increased efficiency by reducing the amount of time utilized for changing tooling elements of the machine and/or by reducing the number of times the tooling elements are changed. Accordingly, implementations of the present disclosure provide increased efficiency during the machining process of the workpiece.

FIG. 1 illustrates a system 100 for determining a pose of a workpiece during a machining process according to various example implementations of the present disclosure. As mentioned previously, the workpiece can include an aircraft fuselage section configured to be machined or securely fastened to other fuselage sections or aircraft parts during a machining or manufacturing process. Examples of suitable machining or manufacturing processes include drilling openings into a workpiece, securely fastening features to a workpiece, attaching or securing a first and a second workpiece to one another, applying sealant or other treatments to a workpiece, and the like.

According to some implementations of the present disclosure, the system 100 includes any of a number of different subsystems (each an individual system) for performing one or more functions or operations to determine the pose of a workpiece during a machining or manufacturing operation on the workpiece. As shown in FIG. 1, the system 100 includes a first pose module 102 and a second pose module 104. Although being shown together as part of the system, it should be understood that either or both of the first pose module 102 and the second pose module 104 can function or operate as a separate system without regard to the other. And further, it should be understood that the system 100 can include one or more additional or alternative subsystems than those illustrated in FIG. 1.

Figure 6:
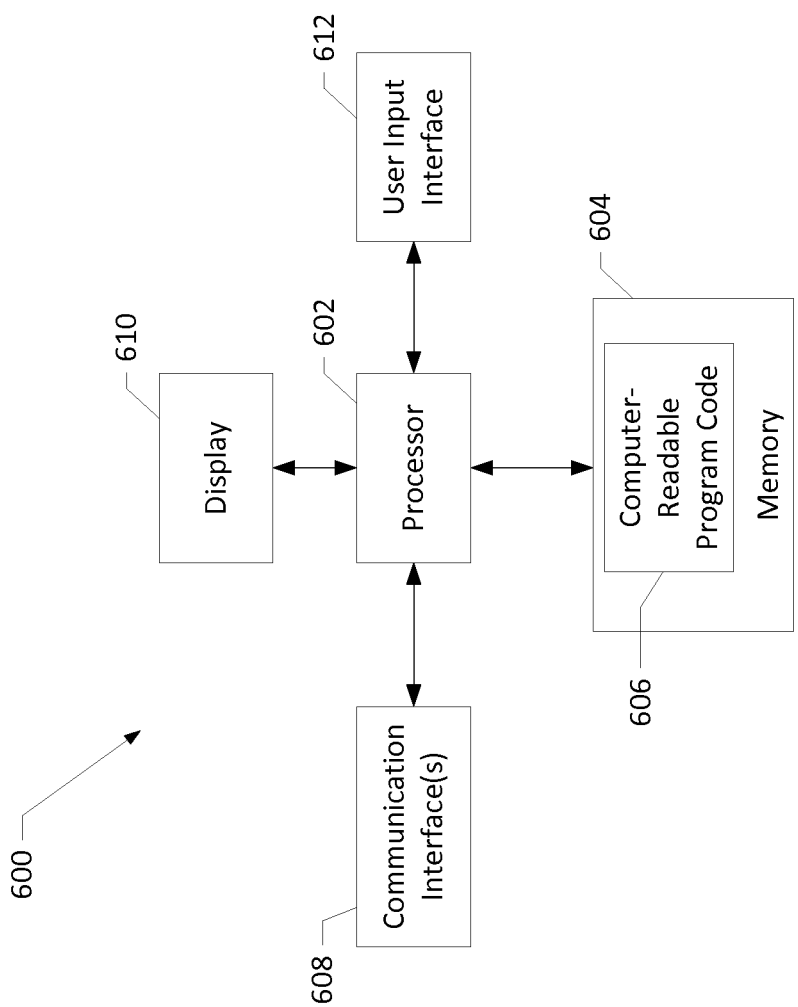
FIG. 6 illustrates an apparatus according to some example implementations.

The first pose module 102 and the second pose module 104 can be embodied as various means, such as circuitry, hardware, a computer program product comprising computer readable program instructions stored on a computer readable medium (e.g., the memory 604, as shown in FIG. 6) and executed by a processing device (e.g., the processor 602, as shown in FIG. 6), or some combination thereof. In some implementations, the first and second pose module can be embodied as one or more fixed or portable electronic devices such as, for example, a smartphone, table computer, laptop computer, desktop computer, workstation computer, server computer and/or the like.

According to one implementation, the first pose module 102 is configured to receive known positions of a plurality of reference features of the workpiece in a first pose in a first coordinate space. Particularly, the positions of the plurality of reference features of the workpiece with respect to the workpiece and/or a coordinate space corresponding to the workpiece are predetermined and known. Examples of suitable reference features include pilot holes, corners, temporary fasteners, openings or the like.

The first pose module 102 is also configured to receive one or more of six components that define a pose of the workpiece. For example, in one implementation described herein, the first pose module 102 can be configured to receive at least two of the six components defining a first pose of the workpiece in a second coordinate space, which may correspond to a coordinate space of a machine tool.

In particular, the first pose module 102 may be configured to receive the pitch and yaw components defining the first pose of the workpiece. The remaining four components (e.g., roll, up/down, forwards/backwards, and left/right) defining the first pose may be unknown. In addition, the pitch and yaw components received by the first pose module 102 may have constant values that are common to both the first and second pose of the workpiece.

According to some implementations of the present disclosure, the first pose module 102 is further configured to determine an estimate of the first pose of the workpiece from the known positions of the plurality of reference features and the at least one known component(s) defining the first pose. In particular, the first pose module 102 is also configured to determine estimates of the unknown components of the first pose. For example, the first pose module 102 is configured to receive measurements corresponding to the known positions of the plurality of reference features. In one implementation, the first pose module 102 receives the position of three discrete reference features of the workpiece. Generally, when the positions of three discrete points of on an object are obtained, the pose of the object can be determined. Accordingly, when the first pose module 102 receives the known positions of the three discrete reference features of the workpiece, the first pose of the workpiece may be determined. More particularly, the first pose module 102 is configured to determine a complete estimate of the first pose of the workpiece in the first coordinate space by determining the four unknown components (e.g., roll, up/down, forwards/backwards and left/right) of the first pose from the known positions of the three discrete reference features of the workpiece and combining those components with the one or more known components (e.g., pitch and yaw in this example) of the first pose.

According to some implementations, the second pose module 104 is configured to receive the values of the at least two known components that are constant and common to both the first and second pose. The second pose module 104 is further configured to determine the second pose of the workpiece in the second coordinate space. For this, the second pose module 104 is configured to receive the estimate of the first pose of the workpiece provided from the first pose module 102. Additionally or alternatively, the second pose module 104 is configured to receive an indication of the components of the first pose held constant and that are thereby common with the second pose. The second pose module 104 is further configured to receive a position of a second feature of the workpiece in the second coordinate space when the workpiece is disposed in a distinct, second pose. The second pose module 104 then determines the second pose of the workpiece from the estimate of the first pose (including common components to the second pose) and the position of the second feature of the workpiece in the second pose. More particularly, the second pose module 104 is configured to determine the second pose of the workpiece in the second coordinate space by determining a solution to a system of equations corresponding to changes in the linear position and the roll component caused by moving the workpiece from the first pose to the second pose. Further, the second pose module 104 is configured to determine the four unknown components defining the second pose and combine the calculated four components with the two known constant components, which are common to both the first and second poses.

FIGS. 2A-2D illustrate a machine system 200 for performing a machining or manufacturing process on a workpiece 210, according to some example implementations of the present disclosure. As shown, the machine system 200 includes a control unit 202 configured to control operation of a machine tool 206 such as an automated numerical control machine tool. In particular, FIG. 2A illustrates the machine system 200 operably engaged with the workpiece 210 with some components (e.g., workpiece carrier 208) removed for additional clarity.

In accordance with example implementations, the control unit 202 includes one or more apparatuses configured to implement the system 100 of FIG. 1 for determining the pose of the workpiece in a second coordinate system (e.g., a coordinate system corresponding to the machine system). For example, the control unit 202 can include the first pose module 102 and the second pose module 104. More particularly, the control unit 202 of exemplary implementations of the present disclosure may comprise, include or be embodied in one or more fixed or portable electronic devices. Examples of suitable electronic devices may include a smartphone, tablet computer, laptop computer, desktop computer, workstation computer, server computer and/or the like.

Additionally, the machine system 200 includes at least one machine tool 206 configured to operably engage the workpiece 210. More particularly, the machine tool 206 includes an end effector unit 204 configured to operably engage the workpiece 210 with a plurality of tooling elements. As discussed in further detail herein, the end effector unit 204 can provide for additional functionality, such as obtaining measurements of the positions of the workpiece features 212 (e.g., reference features 214, a second feature 216, or the like). Each of the tooling elements can be configured to provide differing functionality, such as drilling an opening into the workpiece 210, securely fastening a feature 212 to the workpiece, attaching and/or securing a first workpiece to a second workpiece, applying a sealant and/or other treatments to the workpiece, and/or conducting other suitable machining operations to the workpiece that are known in the art. In some implementations, a first tooling element can be configured to drill an opening on the workpiece, while a second tooling element can be configured to inject, place, and/or otherwise position a fastener into the opening created by the first tooling element. According to implementations of the present disclosure, the systems and associated methods may advantageously provide for increased efficiency in a machining process by decreasing the amount of time required for tooling element changes and/or the frequency of tooling element changes.

Figure 3:
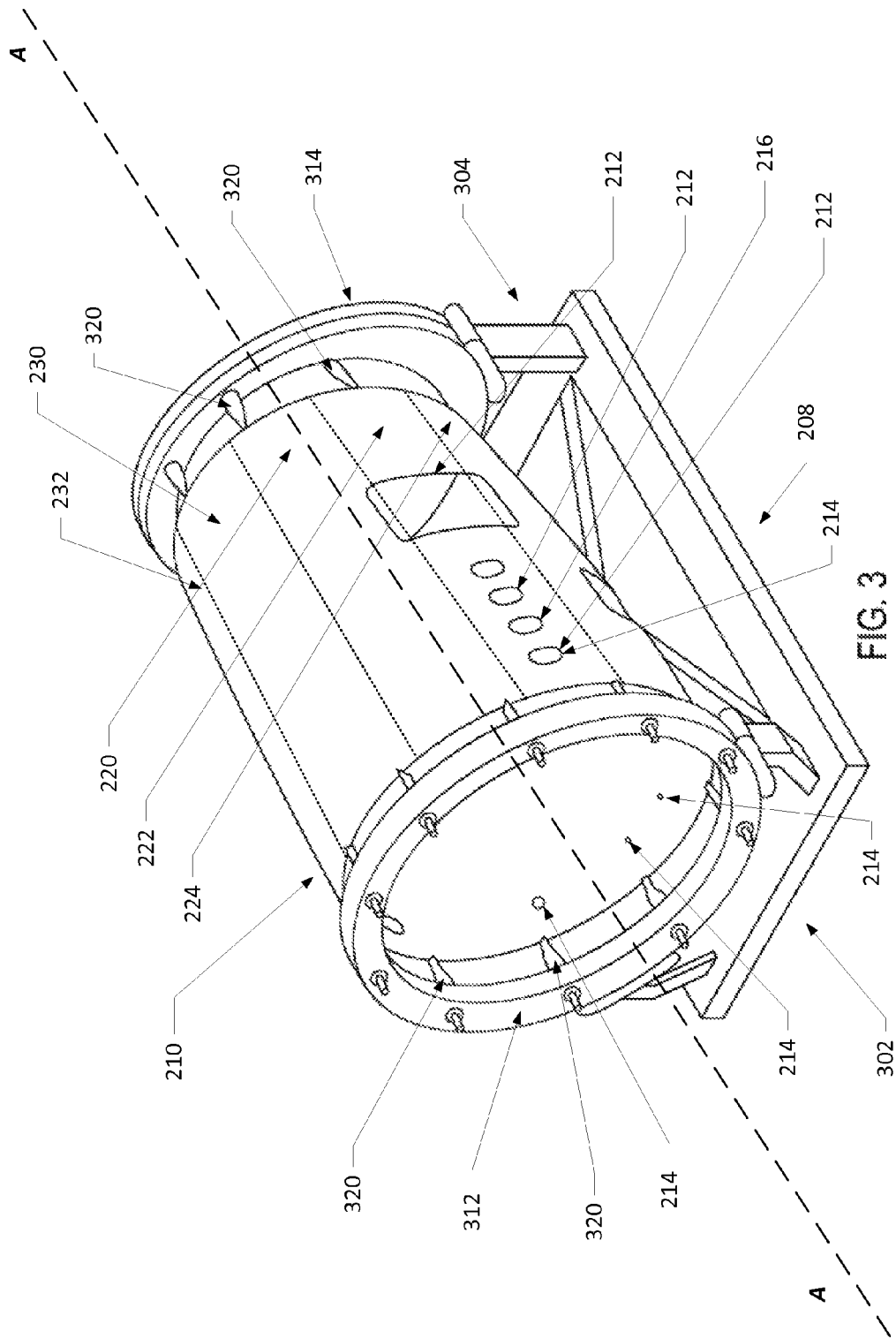
FIG. 3 illustrates a workpiece carrier and a workpiece according to implementations.

As shown in FIGS. 2A-2D and more particularly in FIG. 3, an aircraft fuselage section is one example of a suitable workpiece 210. The workpiece 210 includes or defines discrete features 212 such as pilot holes, corners, temporary fasteners, openings or the like. In some example implementations, the features 212 or others included in or defined by the workpiece 210 may be discrete reference features 214. A reference feature 214 is any discrete feature of the workpiece 210 whose position with respect to a particular coordinate space (e.g., a workpiece coordinate space, which may also be referred to herein as the first coordinate space) is known and/or predetermined. One example of a suitable reference feature 214 includes a pilot hole whose location with respect to the workpiece coordinate space is known and/or predetermined.

As also shown, the machine system 200 includes the workpiece carrier 208 configured to move, transport, and/or manipulate the workpiece 210 such that at least one of the six components defining a pose of the workpiece changes. In particular, the workpiece carrier 208 of some example implementations is configured to translate the workpiece (1) up/down, (2) left/right, or (3) forward/backward; or cause the workpiece to (4) roll, (5) pitch, or (6) yaw. For example, the workpiece carrier can be configured to roll the workpiece about its longitudinal axis A, as shown in FIG. 3.

According to one implementation, the workpiece carrier 208 is further configured to limit at least two components that define the pose of the workpiece 210 from changing as the workpiece moves from the first pose to the second pose. For example, the workpiece carrier 208 may index the workpiece 210 against a flat surface such that at least two components defining the pose of the workpiece are fixed. More particularly, the workpiece carrier 208 can be configured to limit movement of the workpiece as the workpiece is moved from the first pose to the second pose by restricting movement of the workpiece in the pitch and yaw directions. As such, the workpiece carrier 208 can be configured to maintain the pitch and yaw components as constant values (e.g., zero values) that are common to the first and second poses. Alternatively, the workpiece carrier 208 can be configured to maintain the pitch and yaw components as constant, non-zero values that are common to both the first and second poses.

As shown in FIG. 3, the workpiece carrier 208 includes a plurality of components configured to move, transport and/or otherwise manipulate the workpiece. In some implementations, the workpiece carrier 208 includes support rings 312, 314 disposed proximate to longitudinally-opposed first and second ends 302, 304. For example, the workpiece carrier includes a forward support ring 312 disposed proximate to the first end 302 and an aft support ring 314 disposed proximate to the longitudinally-opposed second end 304. Each of the support rings 312, 314 include clamping mechanisms 320 configured to operably engage and/or temporarily secure the workpiece during the machining process. In some example implementations, one or more of the clamping mechanisms 320 may be configured to automatically clamp the workpiece. Additionally or alternatively, for example, one or more of the clamping mechanisms 320 may require manual engagement to clamp the workpiece.

As previously mentioned, the workpiece carrier 208 can be configured to move the workpiece into a pose defined by the six components (i.e., three translational and three rotational components). For example, in some implementations, the forward support ring 312 and aft support ring 314 are configured to rotate about a longitudinal axis, and thus rotate the workpiece about a coincident longitudinal axis A of the workpiece 210 when the forward and aft support rings are clamped to the workpiece. In some examples, the forward and aft support rings may be cooperatively rotatable with respect to one another so as to minimize deformation of the workpiece during rotation.

In some implementations, the workpiece carrier 208 is configured to rotate the workpiece 210 about the longitudinal axis A in multiple steps, thereby defining multiple workpiece zones (e.g., workpiece zones 220, 222, 224, 226, 228, 230, 232), as shown in FIGS. 2A, 2D and 3. The workpiece zones may be defined as equivalent circular sectors and/or portions of the workpiece (i.e., each zone has an equivalent central angle). In another example, the workpiece may include multiple zones that are not identical. As such, the workpiece carrier can be configured to rotate the aircraft fuselage section in unequal steps so as to define the plurality of zones, which may be defined by the various circular sectors and/or portions of the workpiece having differing central angles.

In addition, the workpiece carrier 208 can be configured to dispose and/or constrain the workpiece 210 during a machining process such that the workpiece is disposed in a predetermined normalized pose. A predetermined normalized pose of the workpiece is defined as a pose when the workpiece is disposed proximately normal with respect to the machine system 200 or a machine system coordinate space (e.g. the second coordinate space), as described in greater detail herein. For example, the workpiece carrier 208 is configured to manipulate the workpiece 210 such that any movement, manipulation, positioning and/or the like of the workpiece is limited to the three components of translation and a single component of rotation (i.e., roll). As shown in FIG. 3, the workpiece carrier 208 can be configured to rotate the workpiece about the longitudinal axis A so as to provide for a change in the roll component defining the pose of the workpiece. In some implementations, the workpiece carrier 208 is further configured to limit the rotation of the workpiece about the horizontal and/or vertical axis (i.e., any axis perpendicular to the longitudinal axis A) so as to provide for constant values for the remaining two rotational components (i.e., pitch and yaw) that define the angular position of the workpiece.

As previously mentioned and as shown in FIGS. 2B-2C and 4A-4B, in some examples, the machine system 200 includes the end effector unit 204 configured to provide a plurality of functions, such as machining operations performed by a tooling element of the end effector unit. According to one implementation, the end effector unit 204 includes a plurality of sensors configured to obtain measurements for determining a pose of the workpiece 210. Particularly, as shown in FIGS. 4A and 4B, the end effector unit 204 includes a positioning sensor 400 configured to obtain measurements of the position of features 212 (reference features or otherwise) of the workpiece 210, before, after or during a machining or manufacturing process. Examples of suitable positioning sensors include CCD cameras, laser sensors, radar sensors, sonar sensors and the like.

In one implementation, a positioning sensor 400 is configured to obtain a measurement of at least three reference features 214 of the workpiece 210 for determining a first pose of the workpiece. For example, when three discrete measurements of the workpiece are obtained before a machining process commences, the first pose of the workpiece can be determined. More particularly, the three components of translation and the three components of rotation can be determined for the workpiece 210 within in a three-dimensional coordinate space based upon the three discrete measurements of the workpiece. As such, the positioning sensor 400 is configured to obtain measurements of the positions of at least three discrete reference features 214 for determining any one or more of the six components that define the first pose of the workpiece in a three-dimensional coordinate space.

Additionally, according to some implementations, the end effector unit 204 includes a wireless or wired communications interface configured to communicate the measurements obtained by the positioning sensor to the control unit 202. Accordingly, the control unit 202 is configured to determine an estimate of a first pose of the workpiece in a coordinate space from the positions of the plurality of reference features obtained by the positioning sensor 400 of the end effector unit 204 that are transmitted to by the communications interface of the end effector unit. Particularly, the control unit 202 is configured to determine an estimate of the first pose of the workpiece in a second coordinate space (e.g., a coordinate space corresponding to the machine system) by comparing the obtained measurements of the positions of the reference features to the positions of the reference features that are known in a first coordinate space (e.g., a coordinate space corresponding to the workpiece).

In some example implementations, the positioning sensor 400 includes a CCD camera configured to obtain a measurement of the position of a second feature 216 of the workpiece 210 when the workpiece is disposed in the second pose. Additionally, the end effector unit 204 can be further configured to determine the angular position of the end effector unit relative to a three-dimensional coordinate system (e.g., a three-dimensional coordinate space corresponding to the end effector unit) when the positioning sensor obtains a measurement of the position of the second feature 216 of the workpiece. Additionally, the end effector unit 204 can also be configured to transmit measurements of the position of the second feature 216 to the control unit 202 via the communications interface so that the control unit can determine the second pose of the workpiece 210, as described herein.

As shown in FIGS. 4A and 4B, the end effector unit 204 can include one or more sensor(s) (e.g., sensor(s) 402, 404, 406) configured to obtain measurements so as to verify that the end effector unit 204 is disposed normal with respect to the workpiece 210 when obtaining measurements of various features 212 (reference features or otherwise) of the workpiece 210. In some implementations, the end effector unit 204 is configured to obtain measurements to determine the unit normal of the workpiece. In particular, when the end effector unit 204 is disposed normal with respect to the workpiece 210, measurements obtained by the positioning sensor 400 of the end effector unit are more accurately obtained as substantially zero angular offset between the end effector unit and the feature 212 of the workpiece being measured exists. Additionally or alternatively, when the end effector unit 204 obtains measurements so as to determine the unit normal vector of the workpiece 210, the end effector unit may obtain additional information that is transmitted to the control unit for determining the second pose of the workpiece. As such, one implementation of the present disclosure provides for accurately measuring features of the workpiece so as to determine a pose of the workpiece during a machining or manufacturing process. Likewise, when the end effector unit 204 is disposed normal with respect to the workpiece 210, machining operations are performed with greater accuracy as substantially zero angular offset between the end effector unit and the portion of the workpiece 210 being engaged by the end effector unit exists. Accordingly, another implementation provides for accurately conducting various machining operations by accurately positioning the end effector unit with respect to the workpiece.

As such, the end effector unit 204 can include any number of different types of sensor(s) configured to verify the end effector unit is disposed normal to the workpiece 210. For example, the end effector unit 204 can include a pressure sensor 410 and a plurality of optical sensors 402, 404, 406, such as laser sensors or the like, configured to measure or determine the distance between the workpiece 210 and the end effector unit 204. In some example implementations, the workpiece 210 may be disposed approximately 0.0-1.000 inches, 0.000-0.600 inches, or 0.100-0.500 inches away from the pressure sensor 410 of the end effector unit 204.

In one implementation of the present disclosure, the pressure sensor 410 of the end effector unit 204 is configured to communicate with the control unit 202 in instances where the workpiece 210 contacts, engages or otherwise transmits a force to the pressure sensor. As such, the workpiece carrier 208 is configured to position the workpiece 210 a known distance from the end effector unit 204 of the machine system 200, and the machine system is further configured to trigger an alarm in instances where the workpiece is disposed outside of an acceptable threshold with respect to the machine system.

In some examples, the plurality of optical sensors 402, 404, 406 are configured to determine if the end effector unit 204 is disposed normal relative to the workpiece 210 while obtaining measurements of the features 212 of the workpiece with the positioning sensor 400. More particularly, for example, optical sensors 402 and 404 are configured to determine if the workpiece 210 is rotated about a first axis defining a horizontal coordinate plane of a tooling coordinate space defined by the end effector unit (i.e., determine if the workpiece has any roll relative to the horizontal coordinate plane). Similarly, either of the optical sensors 402, 404 and optical sensor 406 are configured to determine if the workpiece 210 is rotated about a second axis defining the horizontal coordinate plane of the tooling coordinate space (i.e., determine if the workpiece has any pitch relative to the horizontal coordinate plane). As such, the end effector unit 204 is configured to reposition itself such that the end effector unit is disposed normal with respect to the workpiece 210 while obtaining measurements with the positioning sensor 400 of feature(s) of the workpiece.

According to some implementations, a method for determining the pose of a workpiece may include defining a plurality of coordinate spaces. In some implementations, the method can include defining a machine coordinate space (MCS). The MCS can be defined as a three-dimensional coordinate space corresponding to the automated numerical control machine system. In some implementations, the method includes defining a workpiece coordinate space (WCS), which may be defined as a transposition of the MCS. The WCS can also be defined as a three-dimensional coordinate space that corresponds to the workpiece. For example, the WCS may be defined as a transposition of the MCS by applying a zeroing-offset to the MCS such that any movement within the MCS corresponds to an equivalent movement within the WCS. In some implementations, the method can further include defining a tooling coordinate space (TCS), which can be defined as a three-dimensional coordinate space in which measurements are obtained by the end effector unit of the machine and/or as a three-dimensional coordinate space in which machining operations or functions are performed by a machine tool. Additionally, the TCS can be defined as a transposition of any one of the MCS, WCS, and/or other coordinate spaces described herein, as the unit measurements in any of the coordinate spaces are equal with respect to one another. According to another implementation, the method includes defining a workpiece carrier coordinate space (CCS), which can be defined as a translation of the WCS and/or any of the other coordinate spaces. In some implementations, the method includes defining a delta coordinate space (DCS), which includes unit measurements that define a three-dimensional coordinate space corresponding to the change in the pose of the workpiece during a machining process. According to some implementations, the method further includes defining an updated coordinate space (UCS), which can also be defined as a three-dimensional coordinate space in which an updated or second pose of the workpiece is determined during a machining process. In this regard, during a machining process, the workpiece may be repositioned from a first pose, as shown in FIG. 2A, to a second pose, as shown in FIG. 2D. As such, in some implementations of the present disclosure, the UCS may be defined as a transposition of the MCS and/or WCS that corresponds to repositioning the workpiece from the first pose to the second pose.

Methods according to implementations of the present disclosure may advantageously provide for more efficient and accurate determinations of the pose of a workpiece during a machining process. Further, methods according to some implementations of the present disclosure may advantageously provide for a more efficient and accurate machining process. For example, as mentioned previously and shown in FIGS. 2A, 2D and 3, a workpiece 210 can be subdivided into a plurality of workpiece zones (e.g. zones 220, 222, 224, 226, 228, 230, 232) that can be defined as circular sectors or portions of the workpiece. According to some implementations of the present disclosure, a machine tool can be configured and/or constrained to operably engage only a particular zone of the workpiece within an operating envelope of the machine tool. Accordingly, a machine tool can be configured to only operably engage and/or access a single workpiece zone at a particular time. As a result, a machine tool operably engaging a first workpiece zone when the workpiece is disposed in the first pose, as shown in FIG. 2A, cannot operably engage a second workpiece zone unless the workpiece is moved from the first pose to the second pose, as shown in FIG. 2D.

Figure 5:
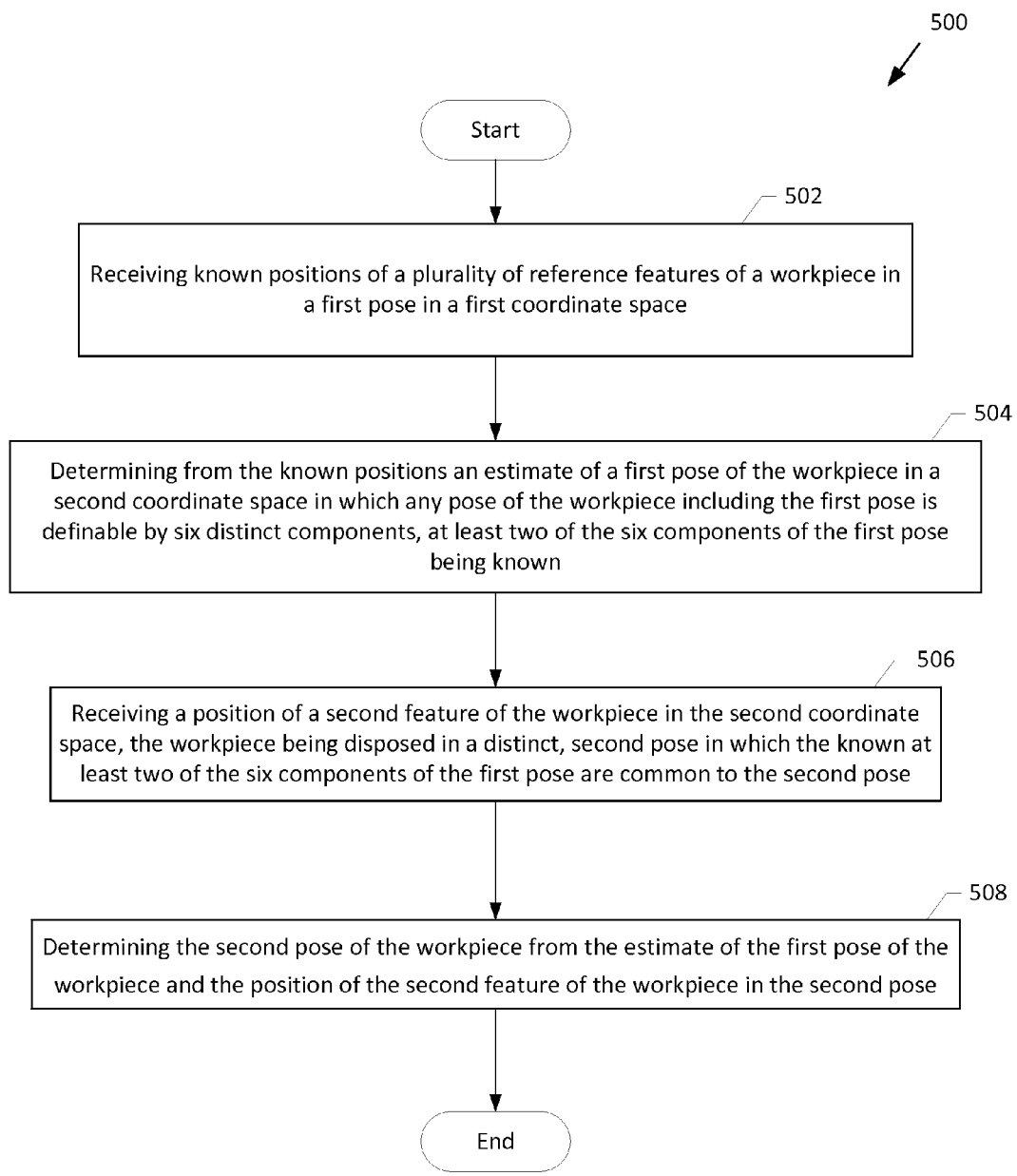
FIG. 5 is a flowchart illustrating various steps in a method according to example implementations.

FIG. 5 illustrates a schematic block diagram of a method 500 for determining a second pose of a workpiece according to one implementation of the present disclosure. The method described herein provides for determining the pose of a workpiece as it moves through each of the various workpiece zones, and provides for a more efficient and accurate machining process by transmitting the second pose of the workpiece to a machine tool configured to engage the workpiece with a first tooling element within each of the workpiece zones as the workpiece moves from one pose to the next. For example, as the workpiece moves from a first pose to a second pose, the first tooling element can engage the workpiece after the second pose of the workpiece has been determined. Because the amount of time to determine the second pose with methods according to implementations of the present disclosure is significantly decreased as only a single position of a second feature of the workpiece in the second coordinate space is required to determine the second pose, the machine can engage the workpiece with the first tooling element in each of the zones before the first tooling element is switched with a second tooling element. The amount of time to switch tooling elements comprises a large amount of time when the machine, machine tool, and/or tooling elements are unable to operably engage the workpiece. As such, methods disclosed herein advantageously provide for decreasing the amount of time spent on tooling element changes by providing for a faster, efficient, and accurate method of determining the pose of the workpiece as the workpiece is moved between poses.

Accordingly, implementations of the present disclosure advantageously provide for a more efficient and accurate method of determining the pose of a workpiece during a machining process. Referring to FIG. 5, at block 502, the method includes receiving known positions of a plurality of reference features of a workpiece in a first pose in a first coordinate space, such as the WCS. For example, the method includes receiving positions of three discrete reference features of a workpiece, where the positions of the three discrete reference features obtained by a positioning sensor are known positions in a first coordinate space, such as the WCS. The positions of the plurality of reference features relative to a particular coordinate space, such as the WCS, are known positions and are comparable with measurements of the positions of the reference features obtained by the positioning sensor in a differing coordinate space, such as the TCS. For example, the method includes receiving positions of the plurality of reference features of the workpiece from measurements obtained by a positioning sensor in the TCS and translating those positions within the TCS to positions within the WCS. In some implementations, the method can also include the control unit of the machine system receiving positions of the three discrete reference features of a workpiece disposed in a first pose.

As such, as shown in block 504, the method can further include determining from the known positions an estimate of the first pose of the workpiece in a second coordinate space in which any pose of the workpiece including the first pose is definable by six distinct components. In various implementations, at least two of the six components defining the first pose are known. For example, the two components defining the first pose that are known can include the pitch and yaw component values.

Additionally, according to one example implementation, the two known components that define the first pose are common to both the first and second pose. As such, the two known components remain constant as the workpiece moves from the first pose to the second pose. For example, the pitch and yaw value components common to the first and second pose can have a zero value and remain constant as the workpiece is moved from the first pose to the second pose. Accordingly, during the machining process, the remaining four components defining the pose of the workpiece may change freely within any of the three-dimensional coordinate spaces.

In some implementations, the pose of the workpiece known in a first coordinate space is combined with the known values of the two components defining the first pose of the workpiece in the second coordinate space to accurately determine an estimate of the first pose in the second coordinate space. In particular, the positions of the three discrete reference features are translated from the first coordinate space to the second coordinate space. Accordingly, the estimate of the first pose of the workpiece in a second coordinate space, such as the MCS, can be determined by translating the positions of the plurality of reference features received in block 502 from the first coordinate space (e.g., WCS) to the second coordinate space (e.g., MCS) in combination with the two known components (e.g., constant yaw and pitch values) defining the first pose of the workpiece in the MCS.

For example, a processor of the control unit is configured to translate the positions of the plurality of reference features from the WCS to the MCS and/or from any coordinate space to a differing coordinate space, as discussed herein. Additionally or alternatively, the processor can be configured to determine an estimate of a first pose of the workpiece within a second coordinate space by processing information such as a known relationship between the first coordinate space and the second coordinate space. For example, a processor can be configured to determine an estimate of the first pose of the workpiece within the MCS by receiving the positions of the reference features in the WCS, translating the positions of the reference features of the workpiece from the WCS to the MCS, and refining the estimate of the first pose with the two known components defining the first pose of the workpiece within the MCS.

As shown at block 506, the method according to some implementations of the present disclosure further includes receiving a position of a second feature of the workpiece in the second coordinate space when the workpiece is disposed in a distinct, second pose in which the two known components of the first pose are common to the second pose. As previously described herein, the second feature 216 can be any discrete feature 212 defined by the workpiece 210 whose position is obtained and/or measured for determining the second pose or any subsequent pose of the workpiece. Any of the features 212 of the workpiece 210, including a reference feature 214, may be embodied as the second feature, and FIG. 3 illustrates an exemplary second feature 216 according to one implementation of the present disclosure.

As previously mentioned, the workpiece is moved from a first pose to a second pose by rotating the workpiece about a longitudinal axis of the workpiece such that only one of the four unknown components that define the pose of the workpiece (e.g., roll) changes. In another implementation, the method can include moving the workpiece such that any one and/or all four of the unknown components (e.g., (1) roll, (2) forward/backward, (3) up/down, and (4) left/right) change as the workpiece moves between the first and second pose. Accordingly, the method includes translating the position of the second feature obtained in any of the coordinate spaces to the second coordinate space. For example, the method can include translating the position of the second feature from the CCS to the MCS, WCS, and/or any of the other coordinate spaces described herein.

Additionally, the position of the second feature 216 of the workpiece provides information corresponding to the movement of the workpiece, and specifically to changes in the values of any of the four, variable components that define any of the poses of the workpiece (i.e., changes in the (1) forward/backward; (2) up/down; (3) left/right; and (4) roll components). In some implementations, the system is configured to receive the position of the second feature 216 of the workpiece by measuring a change in value of a first component (e.g., forward/backward), measuring a change in value of a second component (e.g., roll), and measuring a change in value of a combination of the third and fourth components (e.g., a radial combination of the up/down and left/right components).

In some implementations, the method 500 for determining a pose of a workpiece further includes determining the second pose of the workpiece from the estimate of the first pose of the workpiece and the position of the second feature of the workpiece in the second pose, as shown in block 508. For example, the second pose module 104 can be configured to receive a signal from a positioning sensor corresponding to the position of the second feature 216 of the workpiece in the second coordinate space, as received in block 506. Additionally, the second pose module 104 can be configured to determine the second pose of the workpiece based on the estimate of the first pose, which were previously determined by the first pose module 102 in block 504.

According to one implementation, the method 500 includes determining a second pose of a workpiece based at least in part on obtaining a position of the second feature of the workpiece in a second coordinate space. In some implementations, the method includes determining a second pose of a workpiece based at least in part on determining an estimate of a first pose of the workpiece in the same second coordinate space, which can be determined from the known positions of a plurality of reference features in the first coordinate space that are subsequently translated to the second coordinate space. Additionally, the method can include determining a second pose of the workpiece based on the known values of the at least two components that define the pose of the workpiece that remain constant between the first pose and the second pose. For example, determining the second pose can be based on the known pitch and yaw components of the workpiece that remain constant as the workpiece moves from the first pose to the second pose.

According to another implementation, as previously mentioned, the method 500 for determining a pose of a workpiece includes defining a plurality of coordinate spaces for relating the pose of the workpiece, workpiece carrier, end effector unit, machine, and/or any other apparatus corresponding to the machining process with respect to one another. For example, the method can include defining a CCS, which can be defined as a transposition of the MCS. In another implementation, the CCS can be defined as a translational offset of approximately between 100-200 inches of the MCS along a longitudinal axis of the MCS. In another implementation, the CCS can be defined as a translational offset of approximately between 100-200 inches of the WCS along the longitudinal axis of the WCS. According to some implementations, the method can include defining a WCS, which is defined by applying a zero-offset to the MCS. In some implementations, the zero-offsets applied to the MCS to obtain the transposition of the MCS to the WCS can be determined by receiving the positions of the plurality of reference features of the workpiece in a first coordinate space and determining an estimated first pose of the workpiece based on a transposition of the plurality of reference features from the first coordinate space to the second coordinate space.

In some implementations, the method can include defining a DCS, which can be defined as a three-dimensional coordinate space defined by the change in pose of the workpiece during a machining process. In one implementation, the DCS can be defined as a transposition of the CCS. In particular, the DCS is defined as a three-dimensional coordinate space defined by the change from the estimate of the first pose to the second pose. In some implementations, the DCS is obtained by determining the solution to a system of equations, $$n = R \cdot m + T \quad (1)$$

where R equals a 3×3 rotation matrix defined by the change in pose due to moving the workpiece from a first pose to a second pose. More particularly, R equals a 3×3 rotation matrix defined by rotating the workpiece about the longitudinal axis of the workpiece from a first pose to a second pose (i.e., by changing a single component defining the pose of the workpiece by rolling the workpiece about the longitudinal axis of the workpiece). In other words, R equals a 3×3 rotation matrix defined by the change in the angle θ about the longitudinal axis.

According to one implementation, the nominal position of the second feature of the workpiece is known with respect to any one of the coordinate spaces and/or transposed from any of the coordinate space to the second coordinate space. As such, the nominal position of the second feature of the workpiece can be compared to the position of the second feature obtained in any one of the coordinate spaces that is subsequently transposed to the same coordinate space as the nominal position of the second feature. In this regard, n equals a 3×1 matrix that corresponds to the nominal positions of the second feature $$\left(i.e., \begin{bmatrix} nx \\ ny \\ nz \end{bmatrix}\right)$$

of the workpiece. In particular, n is defined as a 3×1 matrix that corresponds to the expected position of the second feature of the workpiece in a third coordinate space, such as the CCS. As such, after the estimate of the first pose of the workpiece is determined, the positions of the second feature of the workpiece can be transposed to a second coordinate space as the position of the second feature relative to a first coordinate system is known and the transposition between the first coordinate system and a second coordinate system is also known and received in block 506. Additionally or alternatively, the method includes predicting the position of the second feature of the workpiece when the workpiece is disposed in the second pose and comparing the predicted position of the second feature of the workpiece to measurements of the position of the second feature of the workpiece obtained by the positioning sensor.

In one example implementation, m may be defined as a 3×1 matrix that corresponds to a measured position of the second feature of the workpiece $$\left(i.e., \begin{bmatrix} mx \\ my \\ mz \end{bmatrix}\right).$$

In particular, m is defined as a 3×1 matrix that corresponds to the data of the position of the second feature of the workpiece obtained by the positioning sensor and transposed from the TCS to the CCS. Further, T is a 3×1 vector that is defined as $$\begin{bmatrix} \Delta X \hat{i} \\ \dfrac{\Delta r \cdot ny}{Rad} \hat{j} \\ \dfrac{\Delta r \cdot nz}{Rad} \hat{k} \end{bmatrix},$$

where ΔX equals the offset along the x-axis in the CCS, $$\dfrac{\Delta r \cdot ny}{Rad}$$

equals a radial offset along the y-axis in the CCS, $$\dfrac{\Delta r \cdot nz}{Rad}$$

equals a radial offset along the z-axis in the CCS, and Rad= $\sqrt{ny^2 + nz^2}$. Accordingly, the DCS is determined by obtaining ΔX, Δr, and Δθ, which define the solutions to the system of equations $$n = R \cdot m + T \quad (1)$$

As such, the DCS can be defined as a translation of the CCS.

According to another implementation, the method 500 further includes determining the second pose of the workpiece based at least in part on the estimate of the first pose of the workpiece, as shown in block 508, by determining the translation and/or transposition frame of one coordinate space to an updated coordinate space. In particular, the method includes determining the second pose of the workpiece based upon determining the transposition of the MCS to the UCS, based at least in part on the measurements obtained in blocks 502 and 506 and the two constant components that define the pose of the workpiece, which remain constant as the workpiece moves from the first pose to the second pose. For example, the transposition frame to convert the WCS to the CCS can be defined as Frame 5. In addition, the transposition frame to convert the MCS to the WCS is defined as Frame Z1, while the transposition frame to convert the CCS to the DCS is defined as Frame 6. Accordingly, the transposition frame applied to the MCS to determine the UCS, which is defined as Frame 7, can be defined by the following equation, where $$\text{Frame 7} = (\text{Frame Z1} \cdot \text{Frame 5} \cdot \text{Frame 6}) \cdot \text{Frame 5}^{-1} \quad (2)$$

Specifically, the transposition frame applied to the MCS to determine the UCS (i.e., Frame 7) is defined as the product of the transposition frame to convert the MCS to the WCS multiplied by the transposition frame to convert the WCS to the CCS multiplied by the transposition frame to convert the CCS to the DCS, whose product is then subsequently multiplied by the inverse of the transposition frame to convert the WCS to the CCS. In some implementations, the method further includes updating a pose of the workpiece based upon the UCS, and further includes verifying the second pose of the workpiece within the UCS.

According to example implementations of the present disclosure, the system 100 and its subsystems including the first pose module 102 and second pose module 104 may be implemented using for example, an apparatus 600 as shown in FIG. 6. Generally, the apparatus 600 may include or be embodied in one or more fixed or portable electronic devices. Examples of suitable electronic devices may include a smartphone, tablet computer, laptop computer, desktop computer, workstation computer, server computer and/or the like. The apparatus may include one or more of each of a number of components such as, for example, a processor 602 (e.g., processor unit) connected to a memory 604 (e.g., storage device).

The processor 602 is generally any piece of computer hardware that is capable of processing information such as, for example, data, computer programs and/or other suitable electronic information. The processor is composed of a collection of electronic circuits some of which may be packaged as an integrated circuit or multiple interconnected integrated circuits (an integrated circuit at times more commonly referred to as a "chip"). The processor may be configured to execute computer programs, which may be stored onboard the processor or otherwise stored in the memory 604 (of the same or another apparatus).

The processor 602 may be a number of processors, a multi-processor core or some other type of processor, depending on the particular implementation. Further, the processor may be implemented using a number of heterogeneous processor systems in which a main processor is present with one or more secondary processors on a single chip. As another illustrative example, the processor may be a symmetric multi-processor system containing multiple processors of the same type. In yet another example, the processor may be embodied as or otherwise include one or more application-specific integrated circuits (ASICs), field-programmable gate arrays (FPGAs) or the like. Thus, although the processor may be capable of executing a computer program to perform one or more functions, the processor of various examples may be capable of performing one or more functions without the aid of a computer program.

The memory 604 is generally any piece of computer hardware that is capable of storing information such as, for example, data, computer programs (e.g., computer-readable program code 606) and/or other suitable information either on a temporary basis and/or a permanent basis. The memory may include volatile and/or non-volatile memory, and may be fixed or removable. Examples of suitable memory include random access memory (RAM), read-only memory (ROM), a hard drive, a flash memory, a thumb drive, a removable computer diskette, an optical disk, a magnetic tape or some combination of the above. Optical disks may include compact disk-read only memory (CD-ROM), compact disk-read/write (CD-R/W), DVD or the like. In various instances, the memory may be referred to as a computer-readable storage medium. The computer-readable storage medium is a non-transitory device capable of storing information, and is distinguishable from computer-readable transmission media such as electronic transitory signals capable of carrying information from one pose to another. Computer-readable medium as described herein may generally refer to a computer-readable storage medium or computer-readable transmission medium.

In addition to the memory 604, the processor 602 may also be connected to one or more interfaces for displaying, transmitting and/or receiving information. The interfaces may include a communications interface 608 (e.g., communications unit) and/or one or more user interfaces. The communications interface may be configured to transmit and/or receive information, such as to and/or from other apparatus(es), network(s) or the like. The communications interface may be configured to transmit and/or receive information by physical (wired) and/or wireless communications links. Examples of suitable communication interfaces include a network interface controller (NIC), wireless NIC (WNIC) or the like.

The user interfaces may include a display 610 and/or one or more user input interfaces 612 (e.g., input/output unit). The display may be configured to present or otherwise display information to a user, suitable examples of which include a liquid crystal display (LCD), light-emitting diode display (LED), plasma display panel (PDP) or the like. The user input interfaces may be wired or wireless, and may be configured to receive information from a user into the apparatus, such as for processing, storage and/or display. Suitable examples of user input interfaces include a microphone, image or video capture device, keyboard or keypad, joystick, touch-sensitive surface (separate from or integrated into a touchscreen), biometric sensor or the like. The user interfaces may further include one or more interfaces for providing and/or displaying information corresponding to additional components such as for example, a machine tool, a locating tool, a workpiece carrier and/or the like.

As indicated above, program code instructions may be stored in memory, and executed by a processor, to implement functions of the systems, subsystems, tools and their respective elements described herein. As will be appreciated, any suitable program code instructions may be loaded onto a computer or other programmable apparatus from a computer-readable storage medium to produce a particular machine, such that the particular machine becomes a means for implementing the functions specified herein. These program code instructions may also be stored in a computer-readable storage medium that can direct a computer, a processor or other programmable apparatus to function in a particular manner to thereby generate a particular machine or particular article of manufacture. The instructions stored in the computer-readable storage medium may produce an article of manufacture, where the article of manufacture becomes a means for implementing functions described herein. The program code instructions may be retrieved from a computer-readable storage medium and loaded into a computer, processor or other programmable apparatus to configure the computer, processor or other programmable apparatus to execute operations to be performed on or by the computer, processor or other programmable apparatus.

Retrieval, loading and execution of the program code instructions may be performed sequentially such that one instruction is retrieved, loaded and executed at a time. In some example implementations, retrieval, loading and/or execution may be performed in parallel such that multiple instructions are retrieved, loaded, and/or executed together. Execution of the program code instructions may produce a computer-implemented process such that the instructions executed by the computer, processor or other programmable apparatus provide operations for implementing functions described herein.

Execution of instructions by a processor, or storage of instructions in a computer-readable storage medium, supports combinations of operations for performing the specified functions. In this manner, an apparatus 600 may include a processor 602 and a computer-readable storage medium or memory 604 coupled to the processor, where the processor is configured to execute computer-readable program code 606 stored in the memory. It will also be understood that one or more functions, and combinations of functions, may be implemented by special purpose hardware-based computer systems and/or processors which perform the specified functions, or combinations of special purpose hardware and program code instructions. According to some implementations, the apparatus 600 may be integrated with additional components of the system, such as a machine tool described herein.

Many modifications and other implementations of the disclosure set forth herein will come to mind to one skilled in the art to which the disclosure pertains having the benefit of the teachings presented in the foregoing description and the associated drawings. Therefore, it is to be understood that the disclosure is not to be limited to the specific implementations disclosed and that modifications and other implementations are intended to be included within the scope of the appended claims. Moreover, although the foregoing description and the associated drawings describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method of performing a machining or manufacturing operation on a workpiece, the method comprising:
 a machine tool engaging a workpiece to perform a machining or manufacturing operation on the workpiece; and
 a control unit determining a pose of the workpiece, including the control unit at least:
  receiving known positions of a plurality of reference features of a workpiece in a first pose in a first coordinate space;
  determining from the known positions an estimate of the first pose of the workpiece in a second coordinate space in which any pose of the workpiece including the first pose is definable by six distinct components, at least one of the six components of the first pose being known;
  receiving a position of a second feature of the workpiece in the second coordinate space, the workpiece being disposed in a distinct, second pose in which the at least one of the six known components of the first pose are common to the second pose;
  determining the second pose of the workpiece from the estimate of the first pose of the workpiece and the position of the second feature of the workpiece in the second pose; and
  transmitting the second pose of the workpiece to the machine tool to enable the machine tool to locate the workpiece in the second pose, and thereby enable the machine tool to perform the machining or manufacturing operation on the workpiece based thereon.

2. The method of claim 1, wherein receiving the known positions of the plurality of reference features of the workpiece includes receiving the positions of three discrete reference features of the workpiece.

3. The method of claim 1, wherein the six distinct components include three components of translation and three components of rotation, the three components of rotation including pitch, yaw and roll, and
 wherein two of the six components are common to the first pose and the second pose and are the pitch and yaw of the workpiece.

4. The method of claim 1, wherein receiving the position of the second feature of the workpiece in the second coordinate space includes:
 receiving a position of the second feature of the workpiece in a third coordinate space; and
 translating the position of the second feature from the third coordinate space to the second coordinate space.

5. The method of claim 4, wherein any of the coordinate spaces correspond to at least one of the workpiece, a machine, a machine tool, a workpiece carrier, a change in a pose of the workpiece, and/or a distinct, second pose of the workpiece.

6. The method of claim 1, wherein receiving the position of the second feature of the workpiece includes receiving a measured position of the workpiece, and
 wherein determining the second pose of the workpiece includes determining a solution to a system of equations corresponding to a known position of the second feature of the workpiece in the second pose, the measured position of the second feature of the workpiece in the second pose, and a rotation of the workpiece about a longitudinal axis of the workpiece.

7. A machine system comprising:
 a machine tool configured to engage a workpiece to perform a machining or manufacturing operation on the workpiece; and
 a control unit including at least a processor and a memory storing executable instructions that in response to execution by the processor cause the control unit to at least:

receive known positions of a plurality of reference features of the workpiece in a first pose in a first coordinate space;

determine from the known positions an estimate of the first pose of the workpiece in a second coordinate space in which any pose of the workpiece including the first pose is definable by six distinct components, at least one of the six components of the first pose being known;

receive a position of a second feature of the workpiece in the second coordinate space, the workpiece being disposed in a distinct, second pose in which the at least one of the six known components of the first pose are common to the second pose;

determine the second pose of the workpiece from the estimate of the first pose of the workpiece and the position of the second feature of the workpiece in the second pose; and transmit the second pose of the workpiece to the machine tool to enable the machine tool to locate the workpiece in the second pose, and thereby enable the machine tool to perform the machining or manufacturing operation on the workpiece based thereon.

8. The machine system of claim 7, wherein the control unit being caused to receive the known positions of the plurality of reference features of the workpiece includes being caused to receive the positions of three discrete reference features of the workpiece.

9. The machine system of claim 7, wherein the six distinct components include three components of translation and three components of rotation, the three components of rotation including pitch, yaw and roll, and
wherein two of the six components are common to the first pose and the second pose and are the pitch and yaw of the workpiece.

10. The machine system of claim 7, wherein the control unit being caused to receive the position of the second feature of the workpiece in the second coordinate space includes the control unit being caused to:
receive a position of the second feature of the workpiece in a third coordinate space; and
translate the position of the second feature of the workpiece from the third coordinate space to the second coordinate space.

11. The machine system of claim 10, wherein any of the coordinate spaces correspond to at least one of the workpiece, a machine, a machine tool, a workpiece carrier, a change in a pose of the workpiece, and/or a distinct, second pose of the workpiece.

12. The machine system of claim 7, wherein the control unit being configured to receive the position of the second feature of the workpiece includes the control unit being caused to receive a measured position of the workpiece, and
wherein the control unit being caused to determine the second pose of the workpiece includes the control unit being caused to determine a solution to a system of equations corresponding to a known position of the second feature of the workpiece in the second pose, the measured position of the second feature of the workpiece in the second pose, and a rotation of the workpiece about a longitudinal axis of the workpiece.

13. A computer-readable storage medium that is non-transitory and has computer-readable program code portions stored therein that, in response to execution by a processor, cause an apparatus to at least:

receive known positions of a plurality of reference features of a workpiece in a first pose in a first coordinate space, the workpiece being engaged by a machine tool configured to perform a machining or manufacturing operation on the workpiece;

determine from the known positions, an estimate of the first pose of the workpiece in a second coordinate space in which any pose of the workpiece including the first pose is definable by six distinct components, at least one of the six components of the first pose being known;

receive a position of a second feature of the workpiece in the second coordinate space, the workpiece being disposed in a distinct, second pose in which the at least one of the six known components of the first pose are common to the second pose;

determine the second pose of the workpiece from the estimate of the first pose of the workpiece and the position of the second feature of the workpiece in the second pose; and transmit the second pose of the workpiece to the machine tool to enable the machine tool to locate the workpiece in the second pose, and thereby enable the machine tool to perform the machining or manufacturing operation on the workpiece based thereon.

14. The computer-readable storage medium of claim 13, wherein causing the apparatus to receive the known positions of the plurality of reference features of the workpiece includes causing the apparatus to receive the positions of three discrete reference features of the workpiece.

15. The computer-readable storage medium of claim 13, wherein the six distinct components include three components of translation and three components of rotation, the three components of rotation including pitch, yaw and roll, and
wherein two of the six components are common to the first pose and the second pose and are the pitch and yaw of the workpiece.

16. The computer-readable storage medium of claim 13, wherein causing the apparatus to receive the position of the second feature of the workpiece in the second coordinate space includes causing the apparatus to:
receive the position of the second feature of the workpiece in a third coordinate space; and
translate the position of the second feature from the third coordinate space to the second coordinate space.

17. The computer-readable storage medium of claim 16, wherein any of the coordinate spaces correspond to at least one of the workpiece, a machine, a machine tool, a workpiece carrier, a change in a pose of the workpiece, and/or a distinct, second pose of the workpiece.

18. The computer-readable storage medium of claim 13, wherein causing the apparatus to receive the position of the second feature of the workpiece includes causing the apparatus to receive a measured position of the workpiece, and
wherein causing the apparatus determine the second pose of the workpiece causing the apparatus to determine a solution to a system of equations corresponding to a known position of the second feature of the workpiece in the second pose, the measured position of the second feature of the workpiece in the second pose, and a rotation of the workpiece about a longitudinal axis of the workpiece.

* * * * *